Feb. 28, 1950
M. W. HUBER
2,498,810
HYDRAULIC POWER UNIT
Filed Oct. 30, 1947
2 Sheets-Sheet 1
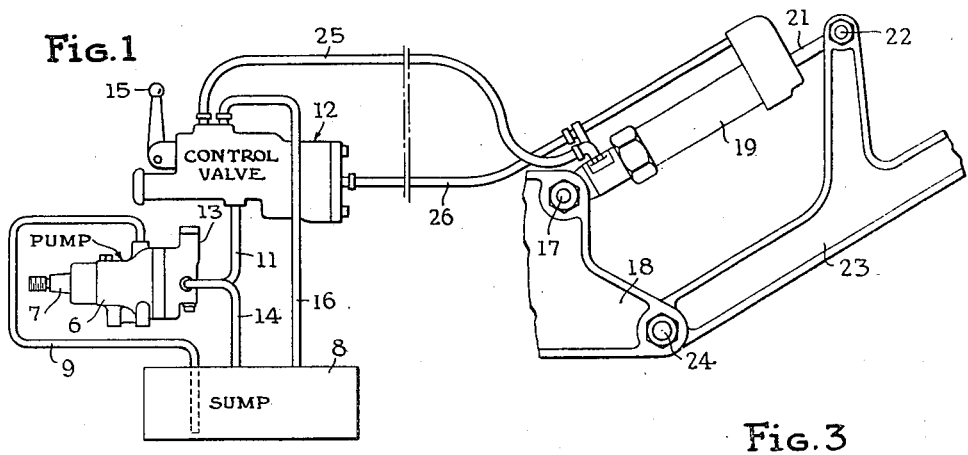
Fig. 1
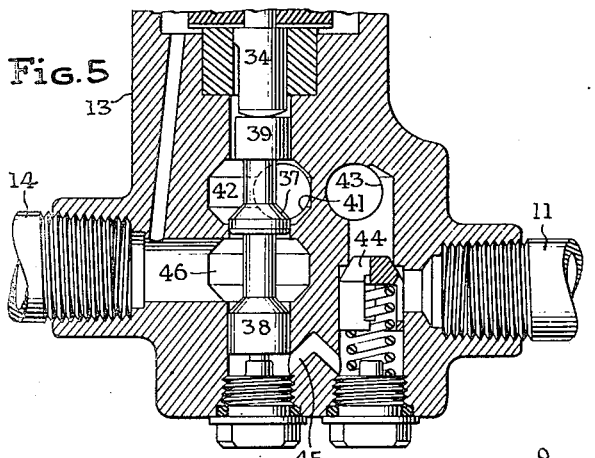
Fig. 5
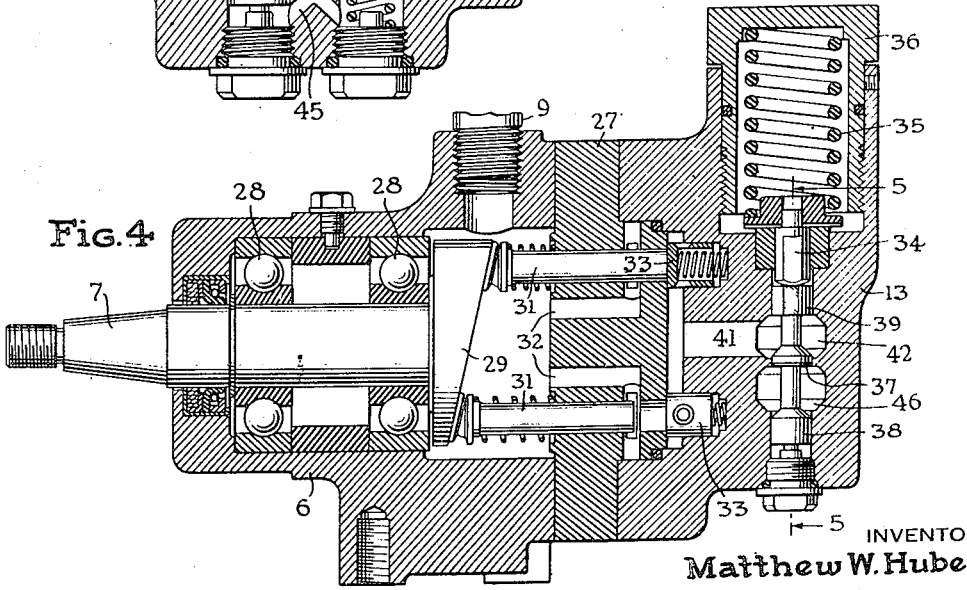
Fig. 4
Fig. 3
INVENTOR.
Matthew W. Huber
BY
ATTORNEYS.

Feb. 28, 1950

M. W. HUBER 2,498,810

HYDRAULIC POWER UNIT

Filed Oct. 30, 1947

INVENTOR.
Matthew W. Huber

BY

ATTORNEYS.

Patented Feb. 28, 1950

2,498,810

UNITED STATES PATENT OFFICE 2,498,810

HYDRAULIC POWER UNIT

Matthew W. Huber, Watertown, N. Y., assignor to The New York Air Brake Company, a corporation of New Jersey Application October 30, 1947, Serial No. 783,011

4 Claims. (Cl. 121—41)

This invention relates to hydraulic power units, and particularly to a versatile unit which may be permanently attached to an agricultural tractor, and used to actuate a device on the tractor or on any towed implement.

The unit comprises two major components. The first of these is mounted wholly in the tractor and is made up of a pump driven by the tractor engine and having, for protective purposes, a pressure-responsive unloader; a slave motor; a pilot valve; and a mechanism operated by the slave motor and imposing an adjustable limiting control in the pilot valve. The second major component, hereinafter called the controlled motor, is a double acting pressure motor connected with the first unit by two flexible hoses, so that it is controlled by the first, but may be variously located, and may be connected to operate a wide range of devices.

Perhaps the most significant characteristic of the power unit is the fact that the controlled motor and the slave motor are both double acting expansible chamber motors hydraulically connected to move in unison through one of the flexible hose connections, which is in constant communication at its ends with one working space of each motor.

The pilot valve has a normal position in which it confines liquid in the other working space of each motor thus hydraulically locking both. From this position it may be moved selectively to connect either of the last named working spaces to supply and the other to exhaust and thus cause the controlled motor to move in relatively reverse directions. In normal position the pilot valve completely unloads the pump, but loads the pump as an incident to its motion away from said normal position.

The motion of the slave motor is used in several ways. Basically its position is a function of the position of the controlled motor. Hence it can function as an indicator of that position. It is used also to limit the controlling functions of the pilot valve and so limit the motion of the controlled motor.

The invention will now be described by reference to the accompanying drawing which shows a preferred embodiment. In the drawings:

Figure 1 is a diagrammatic elevation of the hydraulic power unit.

Figure 3 is a fragmentary section on the line 3—3 of Figure 2.

Figure 4 is an axial section through a preferred form of pump equipped with a pressure-responsive unloader.

Figure 5 is a section on the line 5—5 of Figure 4, drawn on a scale slightly larger than is Figure 4.

Figure 2:
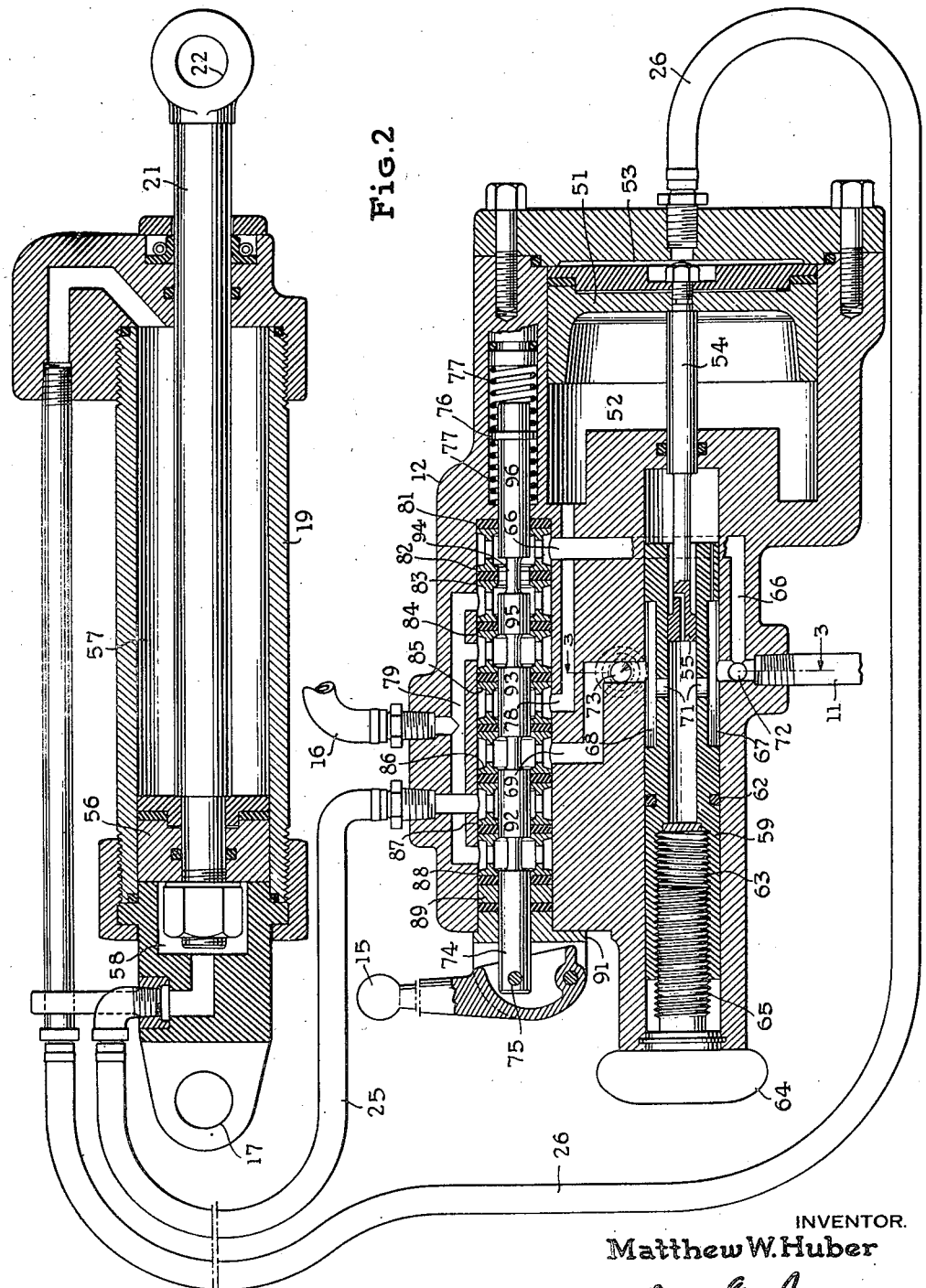
Figure 2 shows in axial section the pilot valve, slave motor, motion limiting valve, controlled motor and the various connections.

Refer first to Figure 1. A pump enclosed in housing 6 and having a drive shaft 7 is driven by any means preferably by the propelling engine of the tractor (not shown). The pump draws oil from sump 8 through suction line 9 and discharges it under pressure through line 11 which leads to the housing 12. This housing encloses the pilot valve, slave motor and related mechanism.

In the cap 13 of the pump is an unloading valve which, when it operates, discharges oil from the pump discharge through line 14 to sump 8. Various unloaders can be used, and the commercial one here described and illustrated is not claimed because it is not the invention of the present applicant.

The control valve in housing 12 is manipulated by a handle 15. A relief line 16 leads from housing 12 to sump 8.

All the parts so far identified by numerals are permanently mounted on the tractor.

Hinged at 17 to a support 18, which may be either a portion of the tractor frame or a portion of the frame of some implement drawn by the tractor is the double acting controlled motor 19. The piston rod 21 of the motor 19 is hinged at 22 to member 23, which, in turn, is hinged at 24 to support 18. Opposite ends of motor 19 are connected by the flexible hose 25 and 26 with housing 12.

To permit the use of a small, comparatively light motor 19, the use of moderately high pressure liquid is desirable. This precludes the use of a gear pump, and recourse is had to a piston pump with in-built unloader, preferably so set that the pump is unloaded at 1500 p. s. i. and loaded at 1000 p. s. i. The illustrated unloader completely unloads the pump when it acts and so tends to minimize heating.

Refer to Figures 4 and 5. The pump body comprises in addition to the housing 6 and cap 13 a cylinder block 27 which is interposed between the two. The shaft 7 turns in combined thrust and radial ball bearings 28 and carries at its inner end a swash plate 29 which reacts to reciprocate a plurality of parallel plungers 31, the plungers being spring-biased toward the swash plate. The inlet ports 32 are controlled by the plungers. Discharge valves 33 are guided in cap 13 and seat against the cylinder block. This construction is in general conformity with known practice in the art.

The unloader valve in cap 13 comprises a pilot valve 34 which is loaded by a spring 35. The loading of the spring 35 may be adjusted by turning the head 36 which is threaded into the cap 13. The unloader valve proper comprises in one piece a valve 37 carried by a slender stem between two piston heads 38 and 39, piston head 39 having a flat on one side, as best indicated in Figure 5.

The discharge passage 41 of the pump leads to chamber 42 and this is connected by passage 43 to the high pressure discharge connection 11 of the pump. Check valve 44, which is spring-biased in a closing direction, is interposed between passage 43 and connection 11. The pressure in connection 11 acts through passage 45 on the outer end of piston 38. When the valve 37 moves upward (as viewed in Figures 4 and 5) it connects chamber 42 (and consequently the pump discharge) with chamber 46. Chamber 46 is connected to the discharge line 14, leading to the sump.

When the pilot valve 34 retreats far enough against the resistance of spring 35 to vent the space at the outer end of the piston 39, the valve 37 will open wide and unload the pump. The adjusting member 36 is preferably so set that the valve 37 opens when discharge pressure reaches 1500 pounds and closes when it falls to 1000 pounds. The shaft 7 is preferably driven continuously while the apparatus is in use.

Refer now to Figures 2 and 3. The housing 12 contains the slave motor comprising a cylinder in which a packed piston 51 works. The piston separates two working spaces 52 to the left of the piston and 53 to the right of the piston. The piston 51 is connected to a piston rod 54 which extends through a packing gland and carries at its extreme end a so-called limiting valve 55.

The controlled motor is an ordinary double-acting piston motor whose cylinder 19 is pivoted at 17 to a support. Piston rod 21 carries a double-acting packed piston 56 which separates two working spaces 57 and 58. The working space 53 of the slave motor is connected by the hose 26 with the working space 57. This connection is liquid filled and is the means by which related motion of the pistons 51 and 56 is assured. Because it is desirable that the piston 56 of the controlled motor have a long stroke and that the piston 51 of the slave motor have a short stroke, the latter is contructed with a considerably larger diameter. This is a detail which may be varied to suit particular installations.

A guideway coaxial with the rod 54 and valve 55 is formed in the housing 12 and receives an axially slidable seat 59. (See Figures 2 and 3). This seat is held against rotation by a stake or key 61, (see Figure 3) and is sealed against leakage by a packing ring 62. The outer end of the seat 59 is bored and threaded as indicated at 63. A knob 64, swiveled in the housing 12, has a threaded stem 65 which engages the threads in the end of the valve seat. Thus the seat may be adjusted axially by turning the knob.

The high pressure connection 11 leads to a passage 66 formed in the housing 12. One branch of this passage communicates with a longitudinal groove 67 formed in the lower side of the valve seat 59. A similar groove 68 formed in the upper side of the valve seat 59 communicates with a continuing pressure passage 69. The valve 55 functions to interrupt communication between the grooves 67 and 68 which normally occurs by way of the diametric port 71.

As clearly shown in Figure 2, a small axial port connects the spaces to the right and left of the valve 55 and a small port drilled in the valve seat connects groove 67 with the space to the right of the valve 55. The only function of the two ports just mentioned is to prevent parts from being liquid bound. The function of the valve 55 is to stop the flow of pressure fluid to the power unit when the piston 51 has moved to the left a distance determined by adjustment of the knob 64. At times it is desirable to suspend this function and, as a convenient means for doing so, a by-pass 72 is arranged to connect passage 66 with passage 69 and is normally closed by manually operable valve 73. The range of adjustment of valve seat 59 is such that it may be set to limit the motion of piston 51 in either of its two directions of movement.

Operation of the controlled motor and its slave motor is controlled by the maneuvering valve actuated by the handle 15. The valve element is a piston valve generally indicated by the numeral 74 and having a pin-and-slot connection 75 with the handle 15. At the right hand end of the valve as viewed in Figure 2, the valve carries a collar 76 which serves as a seat for two oppositely acting springs 77, which are so dimensioned and arranged as to bias the valve to its mid-position, i. e., the position shown in Figure 2. In this position the entire power unit is hydraulically locked and the valve unloads the pump independently of its pressure responsive unloader.

If the handle 15 is swung counterclockwise, the valve functions to admit pressure fluid to working space 58 and exhaust pressure fluid from space 52 at the same time the pump is loaded. If the handle 15 is moved clockwise, the valve functions to connect space 58 to exhaust and to admit pressure fluid to working space 52. This motion also suspends unloading of the pump.

While the seat for the valve 74 could be of conventional design, it is important to provide an inexpensive valve which will be substantially leak-proof. This result is accomplished by constructing the valve seat of a number of identical port-forming metal seat-sections sealed by interposed rubber-like gaskets which not only seal the seat-sections, but also afford seals with the valve itself.

The various seat-sections above mentioned are assembled end to end with the necessary gaskets in a bore formed in the housing 12. To this bore a number of passages lead. For example, passages 66 and 69 both lead to this bore. In addition there is a passage 78 which leads from the space 52 to the bore just mentioned and an exhaust passage 79 which communicates with the line 16 and has three branches leading to the bore.

Counting from right to left, there is a seat-section 82 which communicates with passage 66; two seat-sections 83 and 84 which communicate with the exhaust passage 79; a seat-section 85 which communicates with passage 78; a seat-section 86 which communicates with the extension 69 of the pressure passage; a seat-section 87 which communicates with hose 25 and working space 58; a seat-section 88 which communicates with exhaust passage 79. At each end of the series of seat-sections, and between successive seat-sections of this series, there is, as shown, one of the identical gaskets 81. To the left of seat-section 88 is a guide bushing 89, also sealed by gaskets. The whole assembly is held by cap 91 which is held in place by bolts not visible in the drawing. The lever 15 is hinged to cap 91.

The valve 74 is formed with a plurality of encircling grooves and these are so spaced that when the valve is in the normal position shown in Figure 2, the portions 92 and 93 of the valve blank the connections through the seat-sections 87 and 85 and consequently trap the liquid in spaces 52 and 58. In this neutral position the groove indicated at 94 connects pressure passage 66 with the exhaust passage 79 and so unloads the pump. If the valve is moved in either direction from the position shown in Figure 2, either the portion 95 or 96 will inhibit flow from passage 66 to exhaust passage 79 and consequently load the pump. Upon slight additional motion in one or another opposite directions, reverse admission-and-exhaust connections are established to the spaces 58 and 52, so that pistons 51 and 56 are forced in one or the other direction. Motion of the piston 51 to the left, with reference to Figure 2, is stopped when the valve 55 interrupts the diametric port 71, and so cuts off the supply of pressure fluid. This limiting action can be suspended by opening valve 73.

While the arrangement illustrated is preferred, various modifications are possible. Various types of pump can be used. For example, the unloader may take several forms and in the very simplest installations can be nothing more than a spring loading relief valve, arranged to protect the pump if the motor 19 is stalled by an overload. Such an arrangement is possible because the maneuvering valve unloads the pump except at those times when the motor is to be operated.

Pumps are known which have variable displacement with a controller which responds to discharge pressure. It is possible to use this type of pump.

The maneuvering valve is actually a 4-way valve so far as its direct control of the motors is concerned. Other types of 4-way valves could be used.

The mechanism which imposes limits on the motion of the slave motor can also be modified.

What I claim is:

1. A hydraulic power unit, comprising in combination a pressure pump; two double-acting expansible chamber motors each having two opposed working spaces separated by a movable abutment; means for deriving motion from the abutment of the second motor; a flexible liquid-filled line connecting one working space of the first motor with one working space of the second motor; a pressure line supplied by said pump with liquid under pressure; a multi-way valve supplied by said pressure line and having an exhaust connection and two distributing connections; distributing lines from the last named connections to respective ones of the remaining two working spaces of said motors, at least the line to the second motor being flexible; said valve having two positions in which respectively it connects a different one of the two distributing connections to said pressure line and the other to exhaust, and a third position in which it closes both distributing connections and connects the pressure line to exhaust; and valve means adjustable independently of said multi-way valve, operated at least in part by motion of the abutment of the first motor, and serving to limit to an extent determined by its adjustment the motion of the motors, by terminating the flow of pressure fluid through said valve to said distributing connections.

2. A hydraulic power unit comprising in combination a pressure pump; first and second double-acting expansible chamber motors each having two opposed working spaces separated by a movable abutment; means for deriving motion from the abutment of the second motor; a flexible liquid-filled line connecting one working space of the first motor with one working space of the second motor; a pressure line supplied by said pump with liquid under pressure; a multi-way valve supplied by said pressure line and having an exhaust connection and two distributing connections; distributing lines from the last named connections to respective ones of the remaining two working spaces of said motors, at least the line to the second motor being flexible; said valve having two positions in which respectively it connects a different one of the two distributing connections to said pressure line and the other to exhaust, and a third position in which it closes both distributing connections and connects the pressure line to exhaust; a limiting valve and coacting shiftable valve seat controlling flow through said pressure line; and connections whereby the limiting valve and its seat are shiftable, one by the first motor and the other manually.

3. A hydraulic power unit comprising in combination a pressure pump; first and second double-acting expansible chamber motors each having two opposed working spaces separated by a movable abutment; means for deriving motion from the abutment of the second motor; a flexible liquid-filled line connecting one working space of the first motor with one working space of the second motor; a pressure line supplied by said pump with liquid under pressure; a multi-way valve supplied by said pressure line and having an exhaust connection and two distributing connections; distributing lines from the last named connections to respective ones of the remaining two working spaces of said motors, at least the line to the second motor being flexible; said valve having two positons in which respectively it connects a different one of the two distributing connections to said pressure line and the other to exhaust, and a third position in which it closes both distributing connections and connects the pressure line to exhaust; a limiting valve and coacting shiftable valve seat controlling flow through said pressure line; connections whereby the limiting valve and its seat are shiftable, one by the first motor and the other manually; and a manually operable valve controlling a bypass around said limiting valve.

4. The combination defined in claim 2 in which the limiting valve is of the piston type and is connected to be shifted by the first motor, and the seat is guided axially and is shiftable through a range somewhat greater than the range of motion of the valve, whereby the seat may be set to perform its limiting function as the valve moves in one or the other directions, at the will of the operator.

MATTHEW W. HUBER.

REFERENCES CITED

The following references are of record in the file of this patent:

UNITED STATES PATENTS

| Number | Name | Date |
|---|---|---|
| 1,724,635 | Bath | Aug. 13, 1929 |
| 2,105,473 | Dean | Jan. 18, 1938 |
| 2,392,471 | Fox | Jan. 8, 1946 |